United States Patent
Kameda et al.

(12)

(10) Patent No.: US 9,350,273 B2
(45) Date of Patent: May 24, 2016

(54) PIEZOELECTRIC POWER GENERATING DEVICE HAVING A STRESS APPLYING MEMBER

(71) Applicant: MURATA MANUFACTURING CO., LTD., Nagaokakyo-Shi, Kyoto-Fu (JP)

(72) Inventors: Eitaro Kameda, Nagaokakyo (JP); Katsumi Fujimoto, Nagaokakyo (JP); Toshiki Nishiwaki, Nagaokakyo (JP); Makoto Kitamura, Nagaokakyo (JP); Yuji Fujino, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 97 days.

(21) Appl. No.: 14/261,921

(22) Filed: Apr. 25, 2014

(65) Prior Publication Data

US 2014/0252918 A1 Sep. 11, 2014

Related U.S. Application Data

(63) Continuation of application No. PCT/JP2012/078129, filed on Oct. 31, 2012.

(30) Foreign Application Priority Data

Nov. 9, 2011 (JP) ................................. 2011-245094

(51) Int. Cl.
*H02N 2/18* (2006.01)
(52) U.S. Cl.
CPC ....................................... *H02N 2/18* (2013.01)
(58) Field of Classification Search
CPC ................................. H02N 2/18; H02N 2/181

USPC .......................................................... 310/339
See application file for complete search history.

(56) References Cited

U.S. PATENT DOCUMENTS

| 2,856,564 | A | | 10/1958 | Derwin | |
|---|---|---|---|---|---|
| 3,558,903 | A | * | 1/1971 | Yamano | F02P 3/12 310/339 |
| 3,558,938 | A | * | 1/1971 | Good | H02N 2/183 310/339 |
| 3,819,963 | A | * | 6/1974 | Kondo | H02N 2/18 310/339 |

(Continued)

FOREIGN PATENT DOCUMENTS

| CN | 201663563 U | 12/2010 |
|---|---|---|
| FR | 2 745 476 A1 | 9/1997 |

(Continued)

OTHER PUBLICATIONS

PCT/JP2012/078129 Written Opinion dated Jan. 28, 2013.

(Continued)

*Primary Examiner* — J. San Martin
(74) *Attorney, Agent, or Firm* — Arent Fox LLP

(57) ABSTRACT

A piezoelectric power generating device that includes a piezoelectric element having a first surface and a second surface opposite the first surface, a stopper, and a lever. The stopper has a first contact surface that is in contact with the first surface. The lever includes a contact portion, which includes a second contact surface that is in contact with the second surface, and a displacement portion. The lever is arranged in such a manner as to be rotatable relative to the stopper around a rotation axis such that the second contact surface presses the second surface when the displacement portion rotates relative to the stopper around the rotation axis.

18 Claims, 8 Drawing Sheets

(56) References Cited

U.S. PATENT DOCUMENTS

| | | | | |
|---|---|---|---|---|
| 3,882,388 | A * | 5/1975 | Nery | G01R 13/36 310/314 |
| 2003/0016089 | A1* | 1/2003 | Cousy | H02N 2/18 331/155 |
| 2005/0052097 | A1 | 3/2005 | Tanaka et al. | |
| 2008/0129147 | A1* | 6/2008 | Thiesen | B60C 23/041 310/319 |
| 2013/0181578 | A1* | 7/2013 | Kameda | B60C 23/0411 310/339 |

FOREIGN PATENT DOCUMENTS

| | | | | |
|---|---|---|---|---|
| FR | 2764625 | A1 * | 12/1998 | G07C 9/00174 |
| FR | 2 838 885 | A1 | 10/2003 | |
| JP | 63-310336 | | 12/1988 | |
| JP | 11-146663 | A | 5/1999 | |
| JP | H11-146663 | A | 5/1999 | |
| JP | 11252945 | A * | 9/1999 | |
| JP | 2003-061369 | A | 2/2003 | |
| JP | 2005-151759 | A | 6/2005 | |
| JP | 2005151759 | A * | 6/2005 | |
| JP | 2008-054450 | | 3/2008 | |
| JP | 2008-258343 | A | 10/2008 | |
| WO | WO 01/93413 | A1 | 12/2001 | |
| WO | WO 2011/041679 | A2 | 4/2011 | |
| WO | WO 2013080840 | A1 * | 6/2013 | E05B 45/06 |

OTHER PUBLICATIONS

PCT/JP2012/078129 ISR dated Jan. 28, 2013.

* cited by examiner

PIEZOELECTRIC POWER GENERATING DEVICE HAVING A STRESS APPLYING MEMBER

CROSS REFERENCE TO RELATED APPLICATIONS

The present application is a continuation of International application No. PCT/JP2012/078129, filed Oct. 31, 2012, which claims priority to Japanese Patent Application No. 2011-245094, filed Nov. 9, 2011, the entire contents of each of which are incorporated herein by reference.

FIELD OF THE INVENTION

The present invention relates to a piezoelectric power generating device that includes a piezoelectric element.

BACKGROUND OF THE INVENTION

In the conventional art, a piezoelectric power generating device that includes a piezoelectric element is known as a small-sized power generating device (see, for example, Patent Document 1). Since a piezoelectric power generating device includes a piezoelectric element and a member that applies a stress to the piezoelectric element when an external force such as vibration is applied to the member, the configuration of such a piezoelectric power generating device can be simplified, and such a piezoelectric power generating device can be reduced in size. Therefore, a piezoelectric power generating device is expected to have a wide range of applications such as, for example, in a power supply of a wireless device for a tire pressure monitoring system (TPMS) that is mounted in the interior of a tire.

Patent Document 1: Japanese Unexamined Patent Application Publication No. 2008-54450

SUMMARY OF THE INVENTION

In recent years, there has been a growing demand for further reduction in the size of piezoelectric power generating devices in order to make it possible to mount such piezoelectric power generating devices in various things such as electronic devices, pieces of furniture, and doors and windows of buildings.

It is a main object of the present invention to provide a small-sized piezoelectric power generating device.

A first piezoelectric power generating device according to the present invention includes a piezoelectric element, a stopper, and a lever. The piezoelectric element has a first surface and a second surface. The first surface is positioned on one side in a first direction. The second surface is positioned on the other side in the first direction. The second surface opposes the first surface. The stopper has a stopper contact surface. The stopper contact surface is in contact with the first surface of the piezoelectric element. The lever includes a lever contact portion and a displacement portion. The lever contact portion includes a lever contact surface. The lever contact surface is in contact with the second surface of the piezoelectric element. The displacement portion is positioned further toward the one side in the first direction than the second surface. The lever is arranged in such a manner as to be rotatable relative to the stopper around a rotation axis extending in a second direction that is perpendicular to the first direction. The lever is arranged in such a manner that the lever contact surface presses the second surface of the piezoelectric element when the displacement portion rotates relative to the stopper around the rotation axis.

In a specific aspect of the piezoelectric power generating device according to the present invention, the lever is rotatably supported by the stopper.

In another specific aspect of the first piezoelectric power generating device according to the present invention, a shortest distance between the lever contact portion and the rotation axis is smaller than a shortest distance between the displacement portion and the rotation axis.

In another specific aspect of the piezoelectric power generating device according to the present invention, the piezoelectric power generating device further includes an urging member. The urging member urges, when the lever rotates relative to the stopper in a direction, the lever in a direction opposite to the direction in which the lever rotates.

In another specific aspect of the first piezoelectric power generating device according to the present invention, the urging member urges the displacement portion.

In another specific aspect of the first piezoelectric power generating device according to the present invention, the piezoelectric power generating device further includes a drive mechanism that causes the lever to rotate several times around the rotation axis.

A second piezoelectric power generating device according to the present invention includes a piezoelectric body and a stress applying member. The stress applying member applies a stress to the piezoelectric body. The second piezoelectric power generating device according to the present invention further includes a drive mechanism. The drive mechanism drives the stress applying member in such a manner that the stress applying member applies a stress several times to the piezoelectric body when an external force is applied to the piezoelectric power generating device.

According to the present invention, a small-sized piezoelectric power generating device can be provided.

DETAILED DESCRIPTION OF THE PREFERRED EMBODIMENTS

Figure 1:
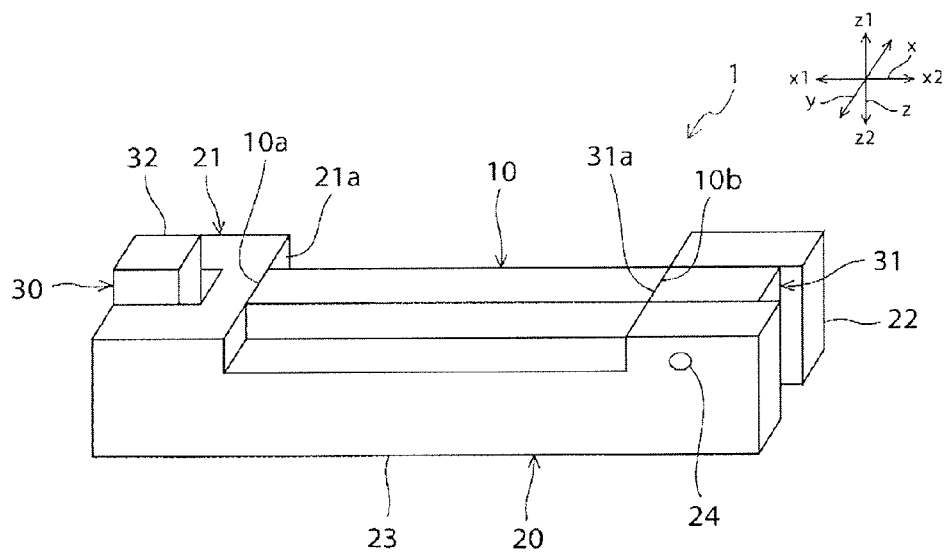
FIG. 1 is a schematic perspective view of a piezoelectric power generating device according to a first embodiment of the present invention.

An example of preferred embodiments of the present invention will be described below. However, the following embodiments are merely examples. The present invention is no way limited to the following embodiments.

In addition, in the drawings that will be referred to in the following embodiments and so forth, members that have substantially the same functions are referred to by the same reference signs. Furthermore, the drawings, which will be referred to in the following embodiments and so forth, are schematically illustrated, and dimensional ratios and so forth of objects that are illustrated in the drawings may sometimes be different from dimensional ratios and so forth of actual objects. The dimensional ratios and so forth of the objects may also sometimes differ between the drawings. The specific dimensional ratios and so forth of the objects should be determined by taking the following description into consideration.

First Embodiment

Figure 2:
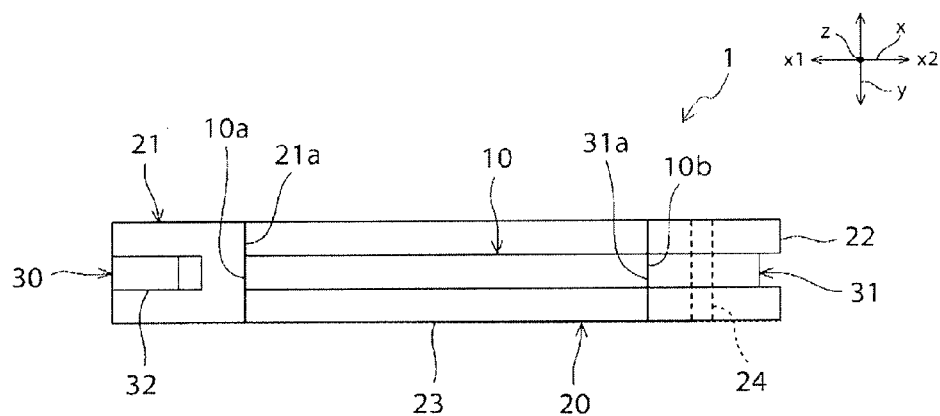
FIG. 2 is a schematic plan view of the piezoelectric power generating device according to the first embodiment of the present invention.
Figure 3:
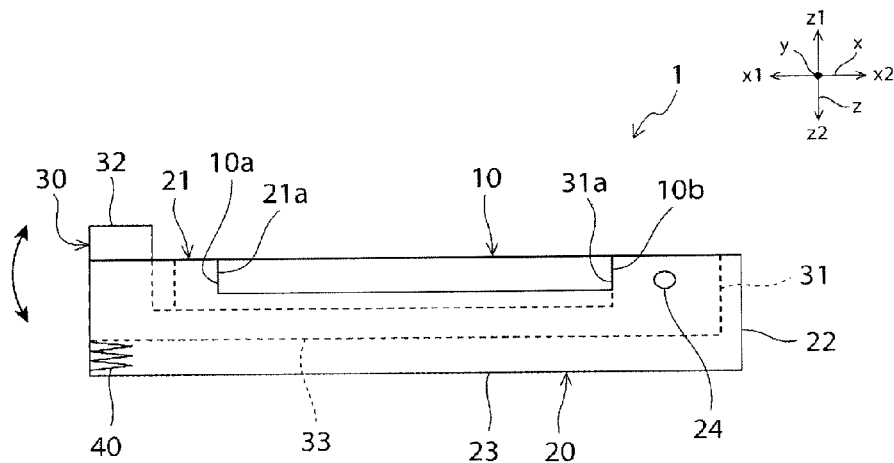
FIG. 3 is a schematic side view of the piezoelectric power generating device according to the first embodiment of the present invention.
Figure 4:
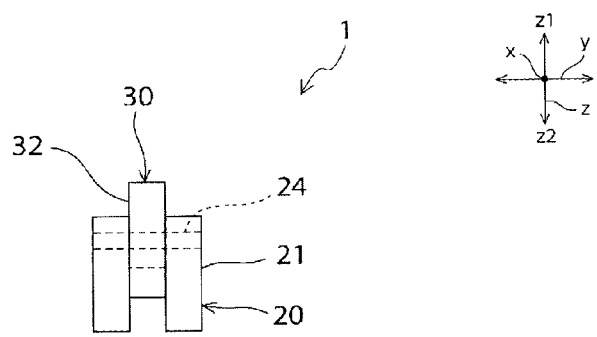
FIG. 4 is a schematic front view of the piezoelectric power generating device according to the first embodiment of the present invention.

FIG. 1 is a schematic perspective view of a piezoelectric power generating device 1 according to a first embodiment of the present invention. FIG. 2 is a schematic plan view of the piezoelectric power generating device 1 according to the first embodiment of the present invention. FIG. 3 is a schematic side view of the piezoelectric power generating device 1 according to the first embodiment of the present invention. FIG. 4 is a schematic front view of the piezoelectric power generating device 1 according to the first embodiment of the present invention. In FIG. 1 to FIG. 4, x-y-z axes of a rectangular coordinate system that are formed of an x axis, a y axis, which is perpendicular to the x axis, and a z axis, which is perpendicular to the x axis and the y axis, are illustrated. Here, the x-axis direction, the y-axis direction, and the z-axis direction are a first direction, a second direction, and a third direction, respectively.

The piezoelectric power generating device 1 includes a piezoelectric element 10, a stopper 20, and a lever 30.

The piezoelectric element 10 includes a piezoelectric body and an electrode. The piezoelectric body can be made of, for example, lead zirconate titanate (PZT) or the like. The electrode may be arranged in any manner as long as the electrode can extract power that is generated in the piezoelectric body. For example, a pair of the electrodes may be arranged in such a manner that the piezoelectric body is clamped therebetween. Each electrode of the pair of electrodes may be formed of a plurality of electrodes.

In the present embodiment, the piezoelectric element 10 is in the form of a column. More specifically, the piezoelectric element 10 is in the form of a square column. The piezoelectric element 10 has a first surface 10a and a second surface 10b. The first surface 10a and the second surface 10b oppose each other in the x-axis direction. The first surface 10a is positioned on the x1 side in the x-axis direction. The second surface 10b is positioned on the x2 side in the x-axis direction. Note that the piezoelectric element 10 may be formed of a multilayer piezoelectric body that includes a plurality of piezoelectric layers and a plurality of inner electrodes stacked on top of one another. In addition, the piezoelectric element 10 need not be in a columnar shape and may be in a different shape such as a flat plate-like shape as long as the piezoelectric element 10 has two surfaces that oppose each other.

The stopper 20 includes a stopper contact portion 21, a support portion 22, a connecting portion 23, and a shaft 24. The stopper contact portion 21 is positioned further toward the x1 side in the x-axis direction than the first surface 10a. The stopper contact portion 21 has a stopper contact surface 21a. The stopper contact surface 21a and the first surface 10a face each other and are in contact with each other.

The support portion 22 is positioned further toward the x2 side in the x-axis direction than the second surface 10b. The support portion 22 and the stopper contact portion 21 are connected by the connecting portion 23. The connecting portion 23 is positioned further toward the z2 side in the z-axis direction than the piezoelectric element 10.

The support portion 22 is provided with the shaft 24 that extends along the y-axis direction. The lever 30 is supported by the shaft 24 in such a manner as to be rotatable around the shaft 24. Therefore, the lever 30 is rotatable relative to the stopper 20 around a rotation axis that extends in the y-axis direction, which is the second direction and is perpendicular to the x-axis direction, which is the first direction.

The lever 30 includes a lever contact portion 31, a displacement portion 32, and a connecting portion 33. The lever contact portion 31 is positioned further toward the x2 side in the x-axis direction than the second surface 10b. The lever contact portion 31 is disposed in an area inside the stopper 20 in the y-axis direction. The lever contact portion 31 has a lever contact surface 31a. The lever contact surface 31a and the second surface 10b face each other and are in contact with each other.

The displacement portion 32 is positioned further toward the x1 side in the x-axis direction than the second surface 10b. More specifically, in the present embodiment, the displacement portion 32 is positioned further toward the x1 side in the x-axis direction than the first surface 10a. The displacement portion 32 is disposed in an area inside the stopper 20 in the y-axis direction. An end portion of the displacement portion 32 on the z1 side in the z-axis direction is positioned further toward the z1 side than an end portion of the stopper contact portion 21 on the z1 side in the z-axis direction. Therefore, a force toward the z2 side in the z-axis direction can be easily applied to the displacement portion 32.

The displacement portion 32 and the lever contact portion 31 are connected by the connecting portion 33. The connecting portion 33 is positioned further toward the z2 side in the z-axis direction than the piezoelectric element 10.

In the piezoelectric power generating device 1, when an operator operates the lever 30 or when vibration, an external force, or the like is applied to the piezoelectric power generating device 1, a force toward the z2 side in the z-axis direction is applied to the displacement portion 32 of the lever 30, and the lever 30 rotates relative to the stopper 20 around the rotation axis (the central axis of the shaft 24), so that, upon the rotation, the lever contact surface 31a of the lever contact portion 31 also rotates around the rotation axis. Therefore, the lever contact surface 31a of the lever contact portion 31 presses the second surface 10b of the piezoelectric element 10 toward the x1 side in the x-axis direction. Specifically, the lever contact surface 31a presses the second surface 10b toward the x1 side in the x-axis direction and the z2 side in the z-axis direction. Therefore, a stress is applied to the piezoelectric element 10. As a result, power is generated in the piezoelectric element 10 by the piezoelectric effect.

The piezoelectric power generating device 1 is provided with an urging member 40 (see FIG. 3). When the lever 30 rotates relative to the stopper 20 in such a manner that the lever contact surface 31a presses the second surface 10b toward the x1 side in the x-axis direction, the urging member 40 urges the lever 30, specifically, the displacement portion 32 of the lever 30 in a direction opposite to the rotation direction of the lever 30. Therefore, the urging member 40 helps the lever 30, which has rotated, return to the original position. Note that the urging member 40 is formed of, for example, a spring or the like.

As described above, in the piezoelectric power generating device 1, the displacement portion 32 of the lever 30 is positioned further toward the x1 side in the x-axis direction (the side of the first surface 10a) than the second surface 10b. The connecting portion 33 of the lever 30 is positioned further toward the z2 side in the z-axis direction than the piezoelectric element 10. Thus, in the piezoelectric power generating device 1, the position of at least a portion of the lever 30 is superposed with the position of the piezoelectric element 10 in the x-axis direction. Therefore, the dimension of the piezoelectric power generating device 1 in the x-axis direction (the first direction) can be reduced.

In the piezoelectric power generating device 1, the shaft 24 is disposed in such a manner that the shortest distance between the lever contact portion 31 and the rotation axis is smaller than the shortest distance between the displacement portion 32 and the rotation axis. Thus, a pressing force of the lever contact surface 31a toward the piezoelectric element 10 is increased by the principle of leverage. Therefore, a further reduction in the size of the piezoelectric power generating device 1 and high power generation efficiency can be facilitated.

In addition, in the piezoelectric power generating device 1, the lever 30 is rotatably supported by the stopper 20. Thus, it is not necessary to provide a member that supports the lever 30 separately from the stopper 20. Therefore, a further reduction in the size of the piezoelectric power generating device 1 can be facilitated.

Since the piezoelectric power generating device 1 is provided with the urging member 40, when a stress toward the z2 side in the z-axis direction is applied to the displacement portion 32 of the lever 30, the lever 30 may swing several times. In addition, the time taken for the lever 30 to return to the original position is reduced by the urging member 40. Therefore, an increase in the power generation amount of the piezoelectric power generating device 1 can be facilitated.

In particular, in the present embodiment, the urging member 40 is arranged in such a manner as to urge the displacement portion 32, which is positioned so as to be spaced apart from the rotation axis, and thus, the time taken for the lever 30 to return to the original position is further reduced. Therefore, a further increase in the power generation amount of the piezoelectric power generating device 1 can be facilitated.

Other examples of preferred embodiments of the present invention will be described below. In the following description, members that have functions substantially common to those of the members in the above-described first embodiment are referred to by common reference signs, and descriptions thereof will be omitted.

Second Embodiment

Figure 5:
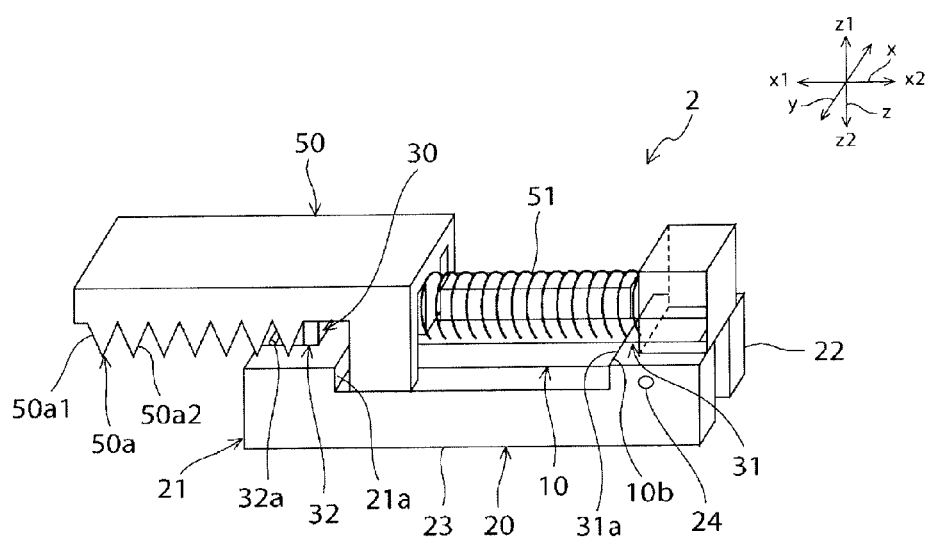
FIG. 5 is a schematic perspective view of a piezoelectric power generating device according to a second embodiment of the present invention.
Figure 6:
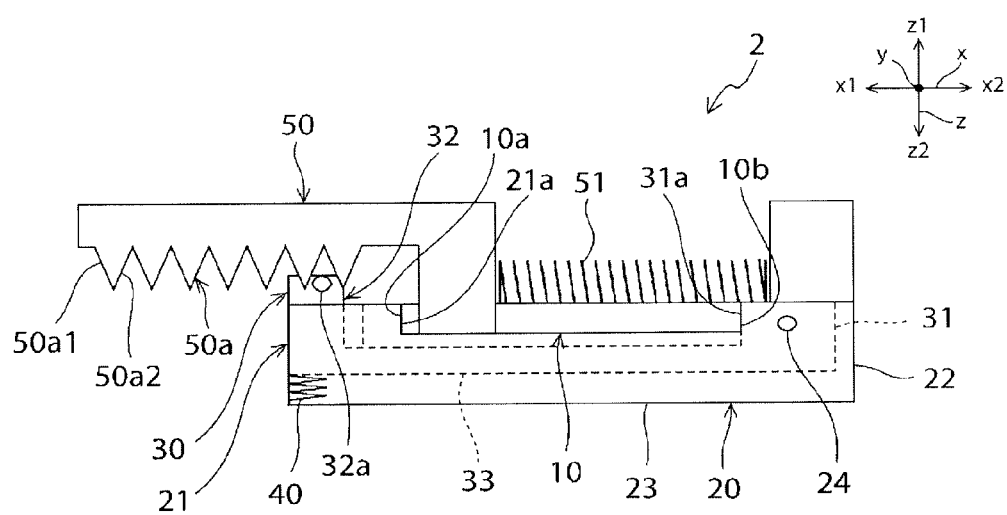
FIG. 6 is a schematic side view of the piezoelectric power generating device according to the second embodiment of the present invention.

FIG. 5 is a schematic perspective view of a piezoelectric power generating device 2 according to a second embodiment of the present invention. FIG. 6 is a schematic side view of the piezoelectric power generating device 2 according to the second embodiment of the present invention.

A difference from the piezoelectric power generating device 1 according to the first embodiment is that the piezoelectric power generating device 2 according to the second embodiment of the present invention includes a slide member 50 that functions as a drive mechanism. When a stress along the x-axis direction, which is the first direction, is applied to the piezoelectric power generating device 2, the slide member 50 causes the lever 30 to rotate around the rotation axis.

Specifically, the slide member 50 is arranged in such a manner as to be displaceable with respect to the stopper 20 and the lever 30 in the x-axis direction, which is the first direction. The slide member 50 is positioned further toward the z1 side in the z-axis direction than the stopper 20 and the lever 30. The slide member 50 includes a plurality of protruding portions 50a that protrude toward the z2 side in the z-axis direction. The plurality of protruding portions 50a are arranged in such a manner as to be superposed with a bar-shaped member 32a that is provided to the displacement portion 32 in the x-axis direction. The bar-shaped member 32a is disposed in such a manner as to extend along the y-axis direction. The plurality of protruding portions 50a each have a pair of inclined surfaces 50a1 and 50a2 that are inclined to the x-axis direction. The inclination angle of the inclined surface 50a1 with respect to the x-axis direction (the displacement direction of the slide member 50) and the inclination angle of the inclined surface 50a2 with respect to the x-axis direction may be the same as each other or different from each other. For example, the inclination angle of the inclined surface 50a2 with respect to the x-axis direction may be greater than the inclination angle of the inclined angle 50a1 with respect to the x-axis direction.

Note that although the inclined surfaces 50a1 and 50a2 are planar in the present embodiment, the inclined surfaces 50a1 and 50a2 may be curved. For example, the cross-sectional shape of the outline of the slide member 50, which includes the plurality of protruding portions 50a, may include a wave-shaped portion at least a part of which is formed of a curved line such as a sine curve.

In the piezoelectric power generating device described in Patent Document 1, when an external force is applied once to the piezoelectric power generating device, a stress is applied only once to the piezoelectric body. Thus, the piezoelectric body needs to be significantly deformed in order to obtain a large power generation amount. Therefore, a stress that is applied to the piezoelectric body becomes large, and thus, the piezoelectric body is likely to break.

In contrast, the piezoelectric power generating device 2 includes the slide member 50 that functions as a drive mechanism and that drives the lever 30, which functions as a stress applying member, in such a manner that the lever 30 applies a stress several times to the piezoelectric element 10 when an external force is applied once to the piezoelectric power generating device 2. In the piezoelectric power generating device 2, when vibration or an external force along the x-axis direction is applied to the piezoelectric power generating device 2, the slide member 50 is displaced relative to the stopper 20 and the lever 30 in the x-axis direction. In this case, when at least one of the plurality of protruding portions 50a passes across the bar-shaped member 32a in the x-axis direction, the bar-shaped member 32a is pressed toward the z2 side by the at least one of the plurality of protruding portions 50a. The number of the plurality of protruding portions 50a that pass across the bar-shaped member 32a in the x-axis direction may be one or more depending on the amount of displacement of the slide member 50 in the x-axis direction, and the bar-shaped member 32a is pressed several times toward the z2 side by the plurality of protruding portions 50a. Thus, during the period when the slide member 50 is displaced once along the x-axis direction, the lever 30 is operated several times. Therefore, in the piezoelectric power generating device 2, even if the magnitude of a stress that is applied to the piezoelectric element 10 as a result of a single rotation of the lever 30 is small, the lever 30 is rotated several times by the slide member 50, so that a stress is applied several times to the piezoelectric element 10, and as a result, a large power generation amount can be obtained on the whole. Therefore, a large power generation amount can be obtained without applying a large stress to the piezoelectric element 10 at the same time. In particular, an elastic member 51 that is formed of a spring or the like is connected to the slide member 50, and thus, the number of times the slide member 50 is displaced in the x-axis direction when a stress is applied to the slide member 50 increases. Therefore, an improved power generation efficiency and further large power generation amount can be realized.

In addition, power is generated in the piezoelectric power generating device 2 not only when vibration or an external force along the z-axis direction is applied to the piezoelectric power generating device 2 but also when vibration or an external force along the x-axis direction is applied to the piezoelectric power generating device 2.

Third Embodiment

Figure 7:
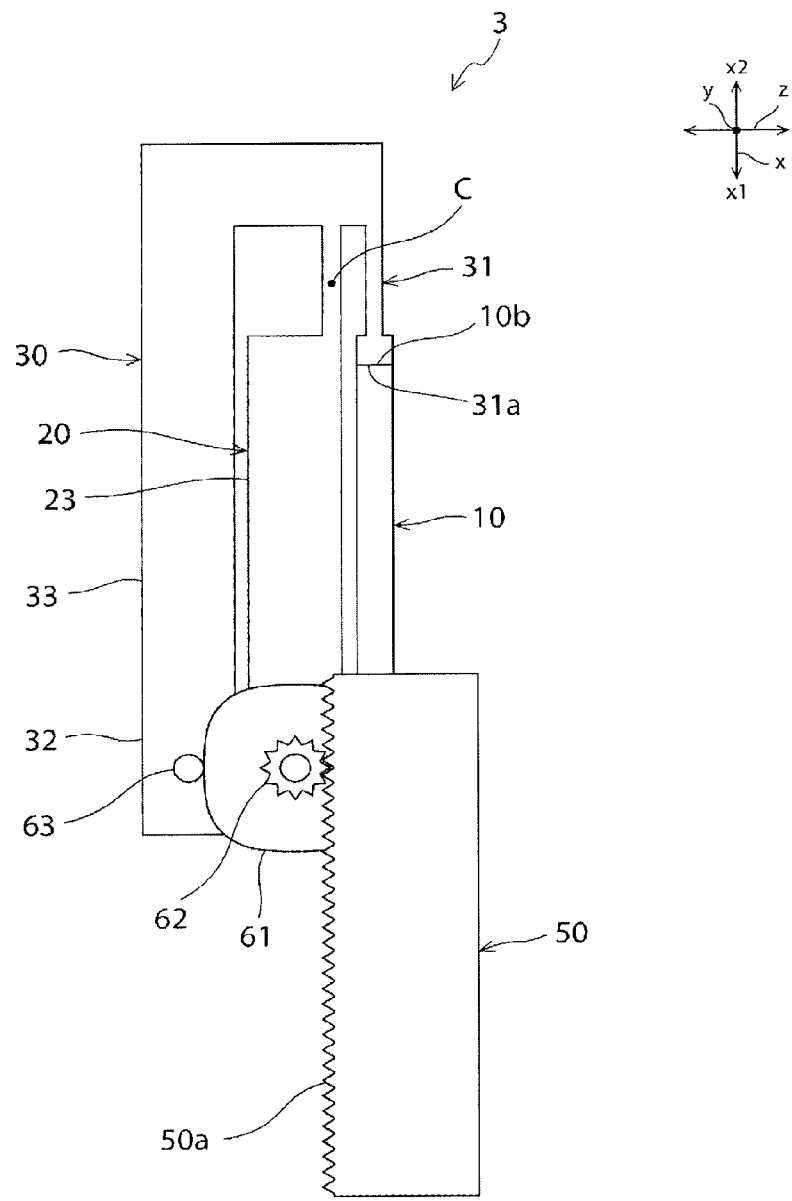
FIG. 7 is a schematic side view of a piezoelectric power generating device according to a third embodiment of the present invention.
Figure 8:
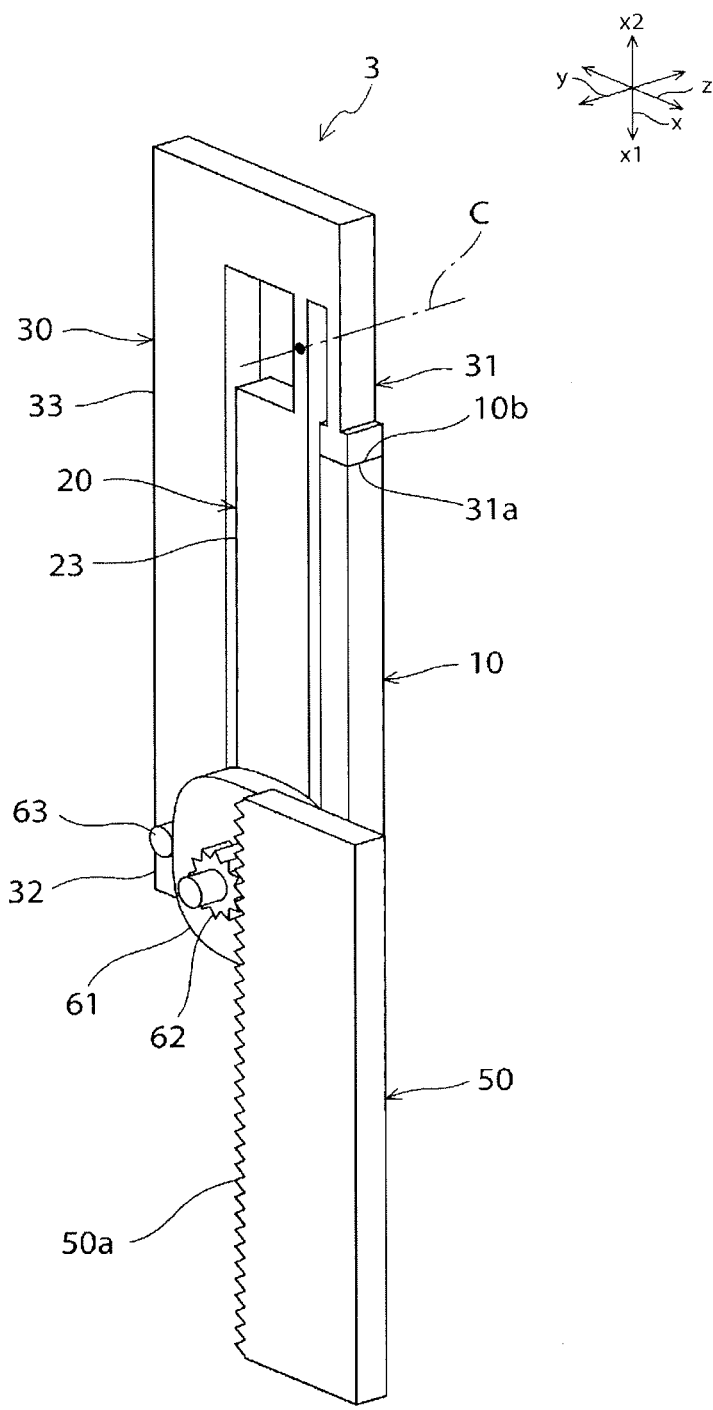
FIG. 8 is a schematic perspective view of the piezoelectric power generating device according to the third embodiment of the present invention.
Figure 9:
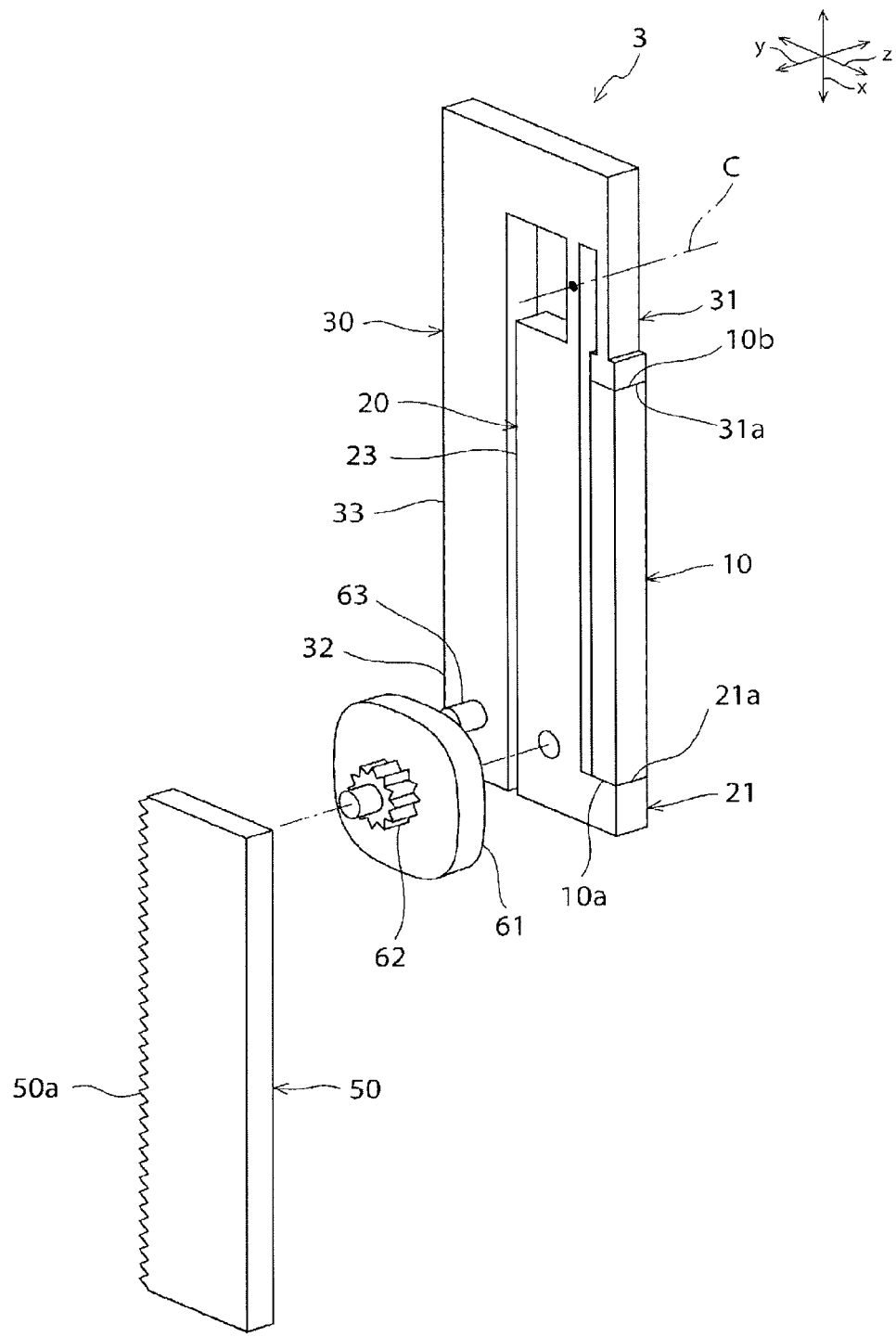
FIG. 9 is a schematic exploded perspective view of the piezoelectric power generating device according to the third embodiment of the present invention.

FIG. 7 is a schematic side view of a piezoelectric power generating device 3 according to a third embodiment of the present invention. FIG. 8 is a schematic perspective view of the piezoelectric power generating device 3 according to the third embodiment of the present invention. FIG. 9 is a schematic exploded perspective view of the piezoelectric power generating device 3 according to the third embodiment of the present invention.

In the piezoelectric power generating device 3 according to the third embodiment of the present invention, the lever 30 is directly connected to the stopper 20. In other words, the stopper 20 and the lever 30 are integrally formed. In the piezoelectric power generating device 3, the displacement portion 32 is provided with a shaft 63. On the other hand, a cam 61 is rotatably mounted on the stopper 20. The cam 61 has a non-circular shape when seen in plan view. More specifically, the cam 61 has an approximately polygonal shape, and more particularly, an approximately rectangular shape when seen in plan view. The outer peripheral surface of the cam 61 and the outer peripheral surface of the shaft 63 are in contact with each other. A shaft 62 is non-rotatably fixed to a center portion of the cam 61. A gear is disposed on the outer peripheral surface of the shaft 62. The slide member 50, which functions as a drive mechanism, is positioned on one side of the shaft 62 in the z-axis direction. The slide member 50 includes the plurality of protruding portions 50a, which protrude toward one side in the z-axis direction, and the slide member 50 is arranged in such a manner as to be displaceable in the x-axis direction. The plurality of protruding portions 50a are formed in such a manner as to engage with the gear, which is disposed on the outer peripheral surface of the shaft 62.

In the piezoelectric power generating device 3, when the slide member 50 is displaced along the x-axis direction, the cam 61 rotates together with the shaft 62. Here, since the cam 61 has a non-circular shape, the shaft 63 swings along the z-axis direction along with a rotation of the cam 61. Along with this, the lever 30 to which the shaft 63 is fixed rotates around a rotation axis C that is positioned in the vicinity of a portion in which the stopper 20 and the lever 30 are connected to each other, and the lever contact surface 31a of the lever contact portion 31 presses the second surface 10b of the piezoelectric element 10 toward the x1 side in the x-axis direction. Therefore, a stress is applied to the piezoelectric element 10. As a result, power is generated in the piezoelectric element 10 by the piezoelectric effect.

Therefore, power is generated in the piezoelectric power generating device 3 also when linear vibration or a linear external force along the x-axis direction is applied to the piezoelectric power generating device 3. In addition, when the slide member 50 is displaced once along the x-axis direction, the lever 30 swings several times in a continuous manner, and thus, power can be generated in a continuous manner.

Note that although an example in which the slide member 50 includes the plurality of protruding portions 50a and in which the gear is disposed on the outer peripheral surface of the shaft 62 has been described in the present embodiment, the plurality of protruding portions 50a and the gear are not essential. The cam 61 may be configured to rotate by a frictional force that is generated between the slide member 50 and the shaft 62.

Modification of Third Embodiment

Figure 10:
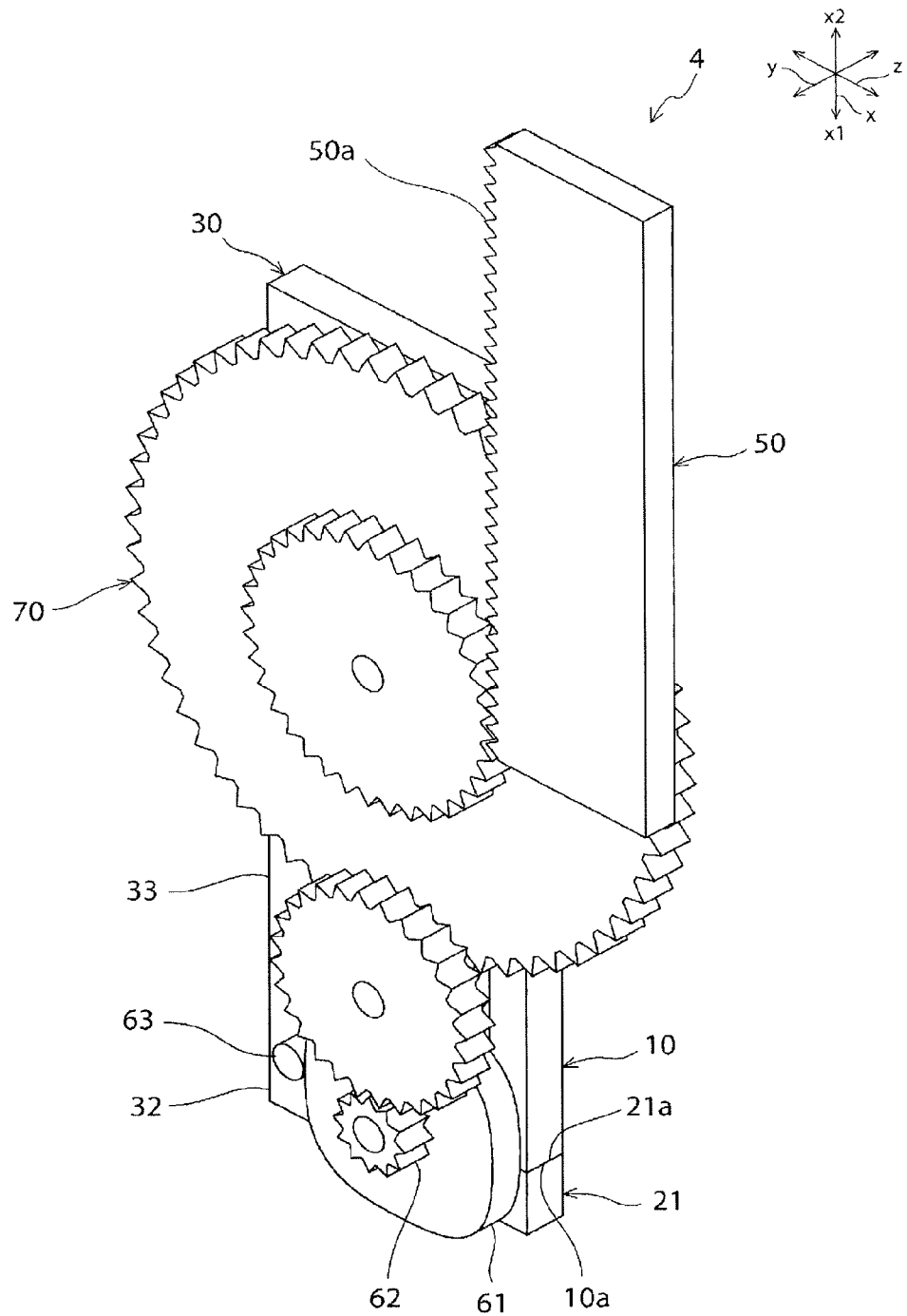
FIG. 10 is a schematic perspective view of a piezoelectric power generating device according to a modification of the third embodiment of the present invention.
Figure 11:
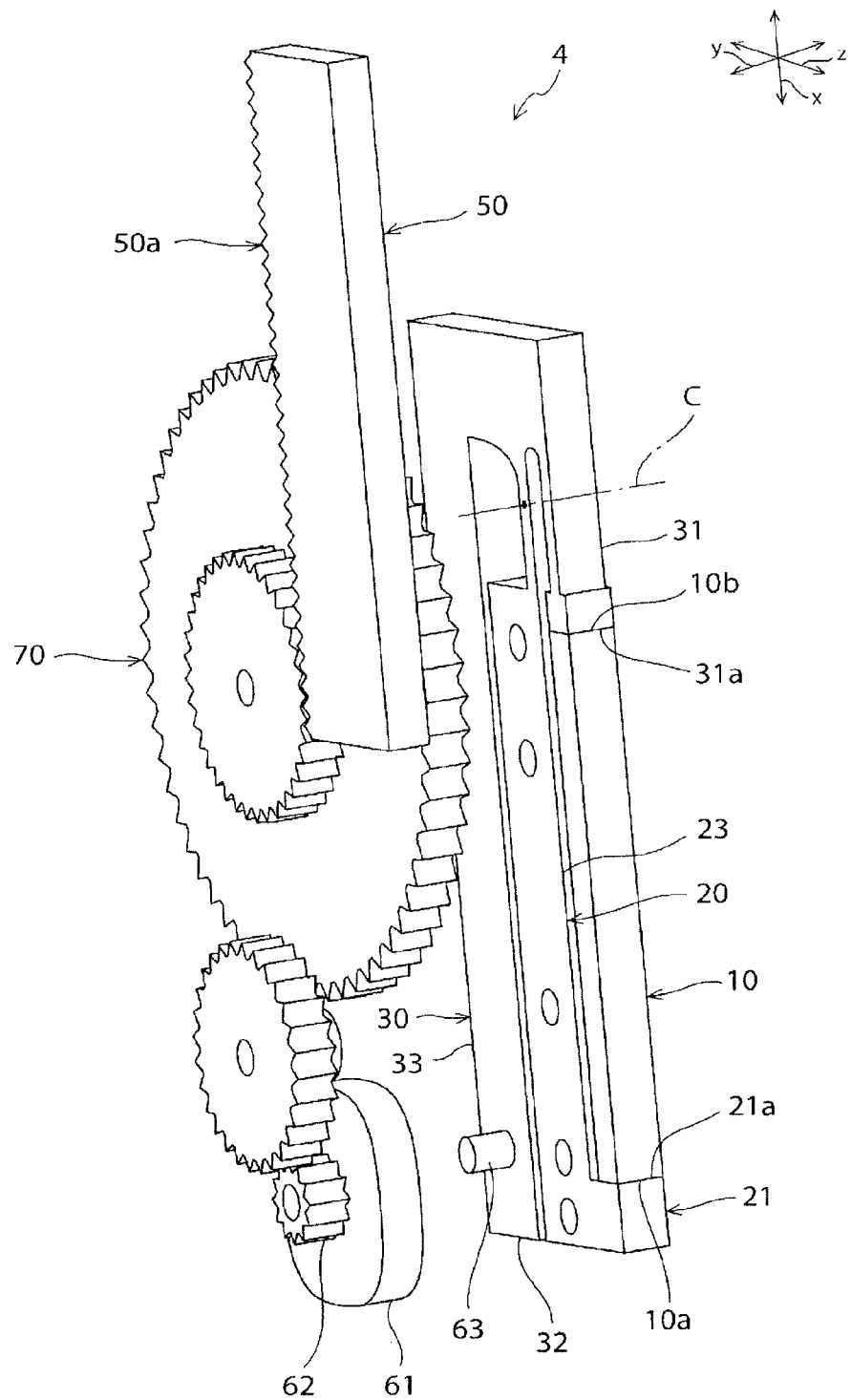
FIG. 11 is a schematic exploded perspective view of the piezoelectric power generating device according to the modification of the third embodiment of the present invention.

FIG. 10 is a schematic perspective view of a piezoelectric power generating device 4 according to a modification of the third embodiment of the present invention. FIG. 11 is a schematic exploded perspective view of the piezoelectric power generating device 4 according to the modification of the third embodiment of the present invention.

A difference from the piezoelectric power generating device 3 according to the third embodiment is that the piezoelectric power generating device 4 according to the present modification includes a transmission mechanism 70. The transmission mechanism 70 includes a plurality of gears and is a mechanism that causes a rotation speed of the cam 61 with respect to a displacement speed of the slide member 50, that is, a speed reduction ratio to vary. The frequency and so forth of vibration that is applied to the piezoelectric element 10 can be adjusted by providing the transmission mechanism 70.

REFERENCE SIGNS LIST 1, 2, 3, 4 piezoelectric power generating device
10 piezoelectric element
10a first surface
10b second surface
20 stopper
21 stopper contact portion
21a stopper contact surface
22 support portion
23 connecting portion
24 shaft
30 lever
31 lever contact portion
31a lever contact surface
32 displacement portion
32a bar-shaped member
33 connecting portion
40 urging member
50 slide member
50a protruding portion
50a1, 50a2 inclined surface
61 cam
62, 63 shaft
70 transmission mechanism

The invention claimed is:

1. A piezoelectric power generating device comprising:
   a piezoelectric element extending along a first direction and having a first surface and a second surface opposed to the first surface;
   a stopper having a stopper contact surface in contact with the first surface of the piezoelectric element; and
   a lever including a contact portion having a lever contact surface in contact with the second surface of the piezoelectric element and including a displacement portion positioned adjacent the first surface of the piezoelectric element such that the stopper contact surface is between the displacement portion and the first surface of the piezoelectric element, the lever being rotatable relative to the stopper around a rotation axis extending in a second direction perpendicular to the first direction.

2. The piezoelectric power generating device according to claim 1, wherein the lever contact surface of the lever presses against the second surface of the piezoelectric element when the displacement portion rotates relative to the stopper around the rotation axis.

3. The piezoelectric power generating device according to claim 1, wherein the lever is rotatably supported by the stopper.

4. The piezoelectric power generating device according to claim 1, wherein a first distance between the contact portion and the rotation axis is smaller than a second distance between the displacement portion and the rotation axis.

5. The piezoelectric power generating device according to claim 1, further comprising:
   an urging member that urges, when the lever rotates relative to the stopper in a direction, the lever in a direction opposite to the direction in which the lever rotates.

6. The piezoelectric power generating device according to claim 4, wherein the urging member is a spring.

7. The piezoelectric power generating device according to claim 4, wherein the urging member urges the displacement portion.

8. The piezoelectric power generating device according to claim 7, further comprising:
   a drive mechanism that causes the lever to rotate several times around the rotation axis.

9. The piezoelectric power generating device according to claim 6, further comprising:
   a drive mechanism that causes the lever to rotate several times around the rotation axis.

10. The piezoelectric power generating device according to claim 1, further comprising:
    a drive mechanism that causes the lever to rotate several times around the rotation axis.

11. The piezoelectric power generating device according to claim 10, wherein the drive mechanism includes a cam rotatably mounted on the stopper and a slider connected to the cam, wherein movement of the slider causes rotation of the cam, and rotation of the cam causes rotation of the lever.

12. The piezoelectric power generating device according to claim 11, further comprising:
    a transmission that causes a rotation speed of the cam to vary with respect to a displacement speed of the slider.

13. The piezoelectric power generating device according to claim 11, wherein the stopper and the lever are integral.

14. The piezoelectric power generating device according to claim 1, wherein the stopper and the lever are integral.

15. A piezoelectric power generating device comprising:
    a piezoelectric body;
    a stress applying member that applies a stress to the piezoelectric body;
    a drive mechanism that drives the stress applying member to apply the stress several times to the piezoelectric body when a force is applied to the piezoelectric power generating device; and
    an urging member that urges, when the stress applying member moves in a direction, the stress applying member in a direction opposite to the direction in which the stress applying member moves.

16. The piezoelectric power generating device according to claim 15, wherein the urging member is a spring.

17. A piezoelectric power generating device comprising:
    a piezoelectric body;
    a stress applying member that applies a stress to the piezoelectric body; and
    a drive mechanism that drives the stress applying member to apply the stress several times to the piezoelectric body when a force is applied to the piezoelectric power generating device,
    wherein the drive mechanism includes a cam rotatably mounted on the stress applying mechanism and a slide connected to the cam, wherein movement of the slide causes rotation of the cam, and rotation of the cam causes movement of the stress applying mechanism.

18. The piezoelectric power generating device according to claim 17, further comprising:
    a transmission that causes a rotation speed of the cam to vary with respect to a displacement speed of the slider.

* * * * *